(12) United States Patent
Seel et al.

(10) Patent No.: US 10,549,698 B2
(45) Date of Patent: Feb. 4, 2020

(54) CARGO SPACE COVER WITH DISPLACEABLE ATTACHMENT ELEMENT

(71) Applicant: Macauto Industrial Co., Ltd., Tainan (TW)

(72) Inventors: Holger Seel, Wuppertal (DE); Sven-Oliver Seel, Wuppertal (DE)

(73) Assignee: Macauto Industrial Co., Ltd., Yongkang District, Tainan (TW)

( * ) Notice: Subject to any disclaimer, the term of this patent is extended or adjusted under 35 U.S.C. 154(b) by 0 days.

(21) Appl. No.: 15/840,143

(22) Filed: Dec. 13, 2017

(65) Prior Publication Data

US 2018/0162280 A1    Jun. 14, 2018

(30) Foreign Application Priority Data

Dec. 14, 2016    (DE) .................. 10 2016 124 329

(51) Int. Cl.
*B60R 5/04* (2006.01)

(52) U.S. Cl.
CPC .................. *B60R 5/047* (2013.01)

(58) Field of Classification Search
CPC .................................... B60R 5/047
USPC ....................................... 296/37.16
See application file for complete search history.

(56) References Cited

U.S. PATENT DOCUMENTS

| 5,727,836 A | 3/1998 | Hosoya | |
|---|---|---|---|
| 6,390,526 B1 * | 5/2002 | Ament | B60R 5/047 160/276 |
| 6,966,591 B2 * | 11/2005 | Schlecht | B60R 5/047 160/370.22 |
| 2004/0232720 A1 | 11/2004 | Schlecht | |

FOREIGN PATENT DOCUMENTS

| CN | 1245464 A | 2/2000 |
|---|---|---|
| CN | 103253210 A | 8/2013 |
| DE | 19637072 C5 | 10/1997 |

\* cited by examiner

*Primary Examiner* — Joseph D. Pape
*Assistant Examiner* — Dana D Ivey
(74) *Attorney, Agent, or Firm* — Von Rohrscheidt Patents

(57) ABSTRACT

A cargo space cover for passenger vehicles including a cover web (11) having a first edge arranged at a winding shaft and movable between a retracted position in which the cover web is rolled up onto the winding shaft and a functional position in which the cover web is the drawn off from the winding shaft; a winding shaft housing (12) in which the winding shaft is rotatably mounted; a spring loaded drive for the winding shaft, which applies a restoring force to the cover web (11) against a pulling force; at least one fixing element (17) a journal (25) configured to fix the cover web (11) in the functional position; and a reinforced end portion (20) located at an end of the cover web (11) away from the winding shaft, wherein the fixing element (17) is movable from an active position for fixing to a storage position.

8 Claims, 6 Drawing Sheets

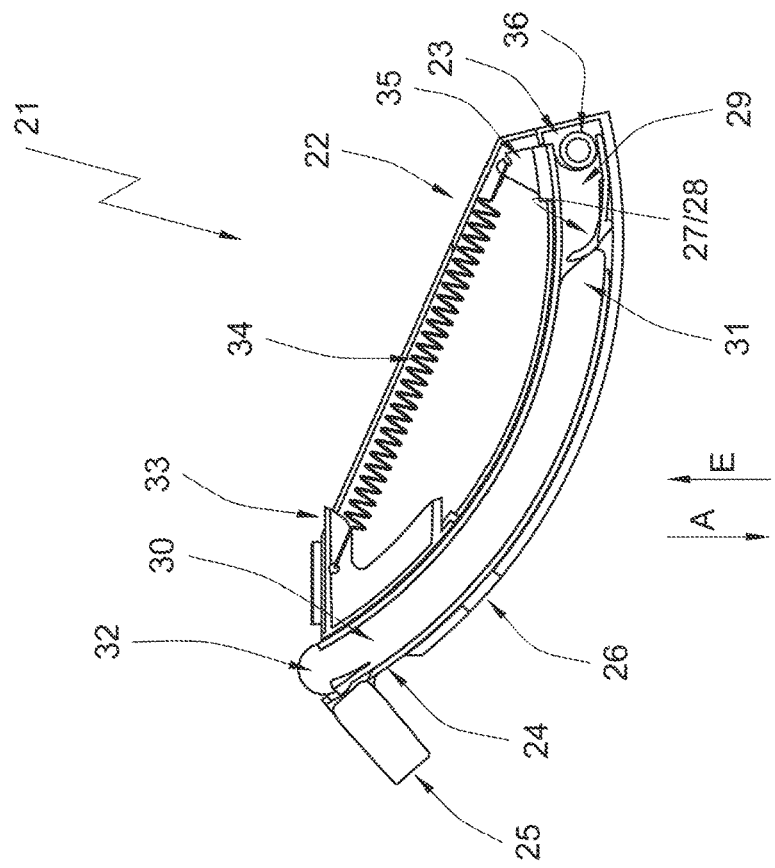
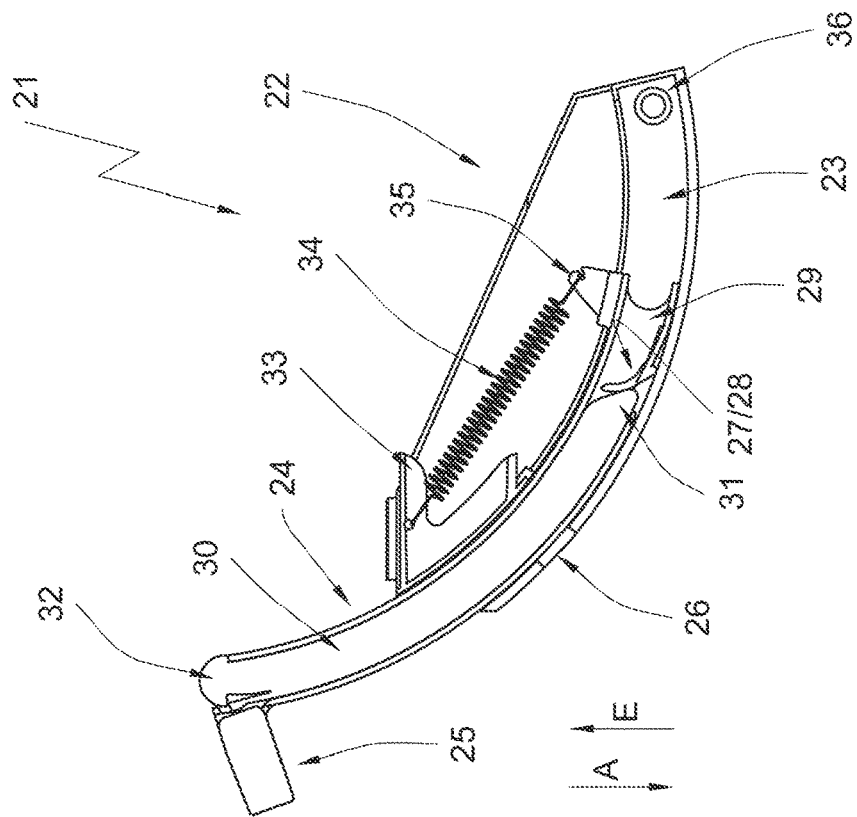

CARGO SPACE COVER WITH DISPLACEABLE ATTACHMENT ELEMENT

FIELD OF THE INVENTION

The present invention relates to a cargo space cover for vehicles, in particular passenger vehicles including a cover web having a first edge arranged at a winding shaft and movable between a retracted position in which the cover web is rolled up onto the winding shaft and a function position in which the cover web is the drawn off from the winding shaft; a winding shaft housing within which the winding shaft is rotatably mounted; a drive, in particular a spring-loaded motor, for the winding shaft, which applies a restoring force to the cover web against a pulling force; at least one fixing element, in particular a journal, configured to fix the cover web to the function position; and a reinforced end portion located at an end of the cover web away from the winding shaft.

BACKGROUND OF THE INVENTION

This type of cargo space cover is used for covering an obviously visible cargo space of a vehicle, in particular a passenger vehicle (which may be preferably a so-called van) from outside. Generally, a winding shaft housing provided with a winding shaft and a cover web arranged on the winding shaft housing are arranged in the area of the second row of seats. The drive of the winding shaft provides rotating movement in a winding direction, such that the cover web is retracted during the rotating movement and is supported at the retracted position. To guide the cover web to the function position, the cover web is driven or the cover web is taken down manually by a user from the winding shaft. Generally, a protruded fixing element in the form of a journal is engaged with a recess on a side surface of the vehicle laterally, or rather, in a manner of traversing a driving direction, so as to maintain the cover web at the function position.

The body form of a modern vehicle gradually has, in the plane of the cover web, a radius which allows a gradual retracting of the cargo space. As a result, generally, a stretching rod at an end portion of the cover web will not be drawn out to a door of the cargo space.

Therefore, the end portion of the cover web needs to be reinforced, in particular in a self-supporting way. Preferably, a contour plate is provided, which covers a gap between a drawbar and the door of the cargo space. For simplification, the drawbar is now a part of the contour plate, and generally no longer available as a separate component.

An increasingly large radius requires to be measured increasingly deep in a moving direction of the cover web. Consequently, a gap between an end portion of the contour plate near the door and the fixing element is expanded. This first results in that the unsupported contour plate sways during driving when the cargo space cover is in the function position, and then results in noise and an increased load of the fixing element. To avoid this problem, generally, a bearing additionally used for the contour plate needs to be disposed at the side surface of the vehicle.

When the cover web is in its retracted position, that is, when the cover web is rolled up onto the winding shaft, the contour plate however protrudes with respect to the winding shaft housing and prevents the use of the cargo space in particular when a ratio of the depth of the cargo space to the depth of the contour plate is in an unfavorable proportion. In addition, during driving, the contour plate easily sways in this case, which results in unfavorable noise and a load of the material. Alternatively, such contour plate is often folded up. However, due to this, rearward field of view of the user of the vehicle is generally limited.

DE 196 37 072 C5 shows a cargo space cover, which a fixing element is arranged at a support that points to the direction of a winding shaft housing. Based on this, a reinforced end portion having a relatively small depth may be used. However, when the cover web is in its retracted position, the support hinders an operation on the cargo space cover.

BRIEF SUMMARY OF THE INVENTION

An object of the present invention is to provide a cargo space cover, which at least shortens a contour plate in a case of a given body form.

This object is achieved by a cargo space cover with the features of claim 1, in particular with its characterizing features, according to which, the fixing element can move from an active position suitable for fixing to a storage position suitable for bearing, in particular when the fixing element is movable in a direction of the end portion away from the cover web of the winding shaft, relative to the cover web.

The active position of the fixing element is generally far away from an edge of the reinforced end portion away from the winding shaft. On the contrary, the storage position of the fixing element is close to the edge of the reinforced end portion away from the vending shaft. In particular in the retracted position of the cargo space cover, that is, when the cover web is rolled up onto the winding shaft, the fixing element is allowed to move in a direction of the reinforced end portion away from the winding shaft. The reinforced end portion itself can shorten the path of movement of the fixing element and can be replaced by a flexible section of the cover web. Therefore, the cover web section in place of the shortened reinforced end portion can also be rolled up onto the winding shaft, after the fixing element moves to its storage position. Therefore, the reinforced end portion (which is generally constructed as a contour plate in the prior art) is shortened. The tendency of swaying is significantly decreased during driving in a case in which the cover web is rolled up. In addition, the accessibility to the cargo space is correspondingly improved.

When the cover web is taken down from the winding shaft and is moved to the function position, the fixing element moves back to its active position such that the shortened reinforced end portion and the additional cover web section cover a gap between a cargo door and the fixing element due to the body form.

It should be provided that a spring element acts against the movement of the fixing element from the active position to the storage position, in particular when the spring element has a spring force lower than a restoring force of the drive of the winding shaft.

Therefore, it is feasible that the finding shaft moves the fixing element from the active position to the storage position when the cover web moves to its retracted position, such that a user does not need to perform additional engagement. In the opposite case, when the user moves the cover web to its function position, the fixing element is automatically moved back by the spring in the function position, such that in this way, the user does not need to perform an additional operation either.

In addition, a locking element is provided to maintain the fixing element in the active position.

The locking element in turn maintains the fixing element in its active position. This is necessary in particular when the cargo space cover is in the function position, in order to ensure the reliable retention of the fixing element in the effective position against the restoring force of the drive of the winding shaft.

In addition, it is provided that the cargo space cover is provided with a guide within which the fixing element is movable, in particular when the guide is a part of the reinforced end portion and has an edge contour accommodating a body form of the passenger vehicle. Therefore, first, it is ensured that the fixing element moves along a controlled moving path. In addition, in a particularly advantageous manner, the guide, together with the fixing element, can reinforce the reinforced end portion of the cover web.

BRIEF DESCRIPTION OF THE DRAWINGS

Other advantages of the present invention are described below in the description of the embodiments, which also help better understand the concept of the present invention, wherein:

FIG. 5 is an illustration of the fixing unit according to FIG. 3, with a fixing element that moves partially;

FIG. 6 is an illustration of the fixing unit according to FIG. 3, with a fixing element in a storage position;

DETAILED DESCRIPTION OF THE INVENTION

Figure 1:
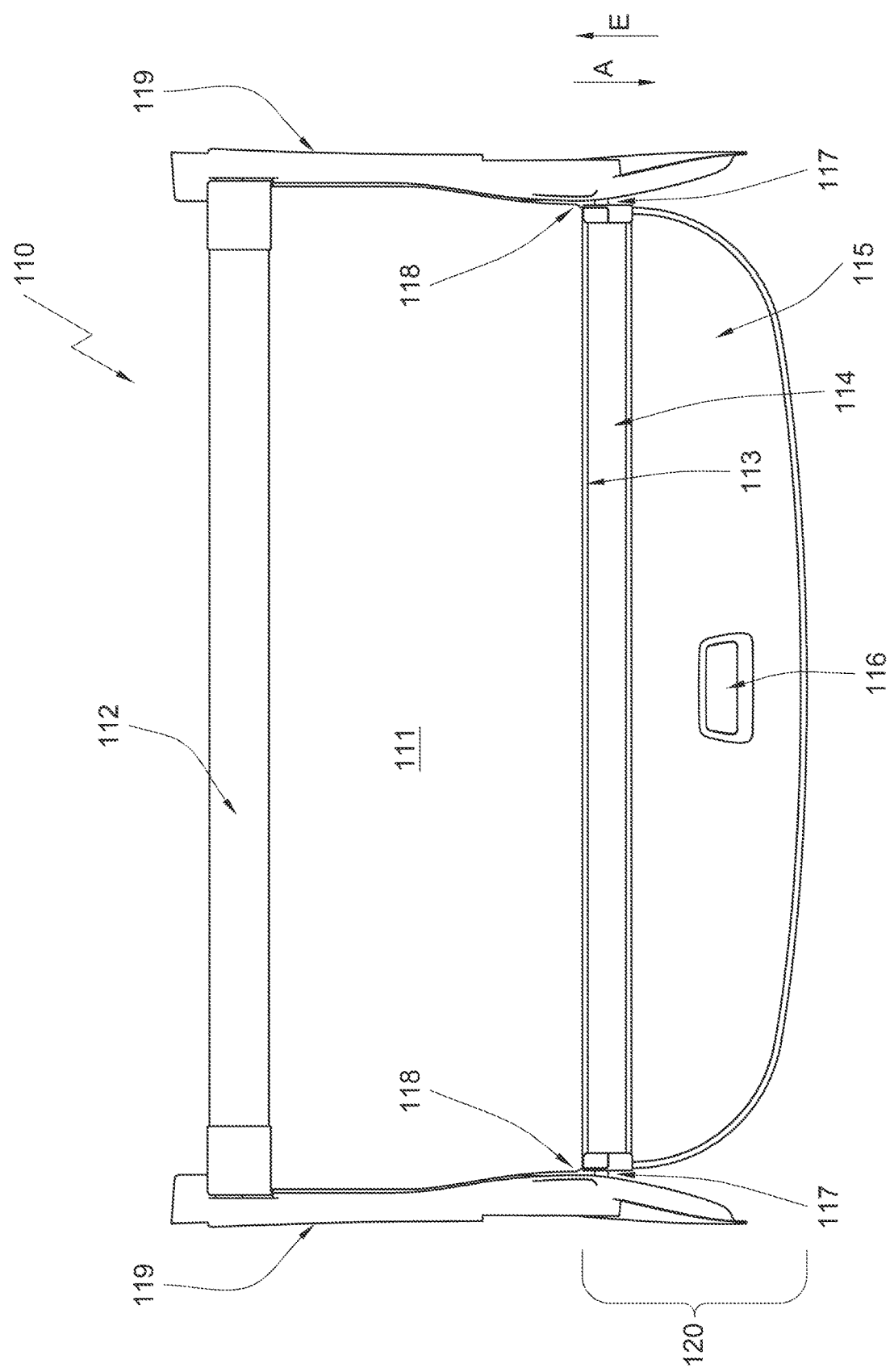
FIG. 1 shows a cargo space cover of the prior art in a function position.
Figure 2:
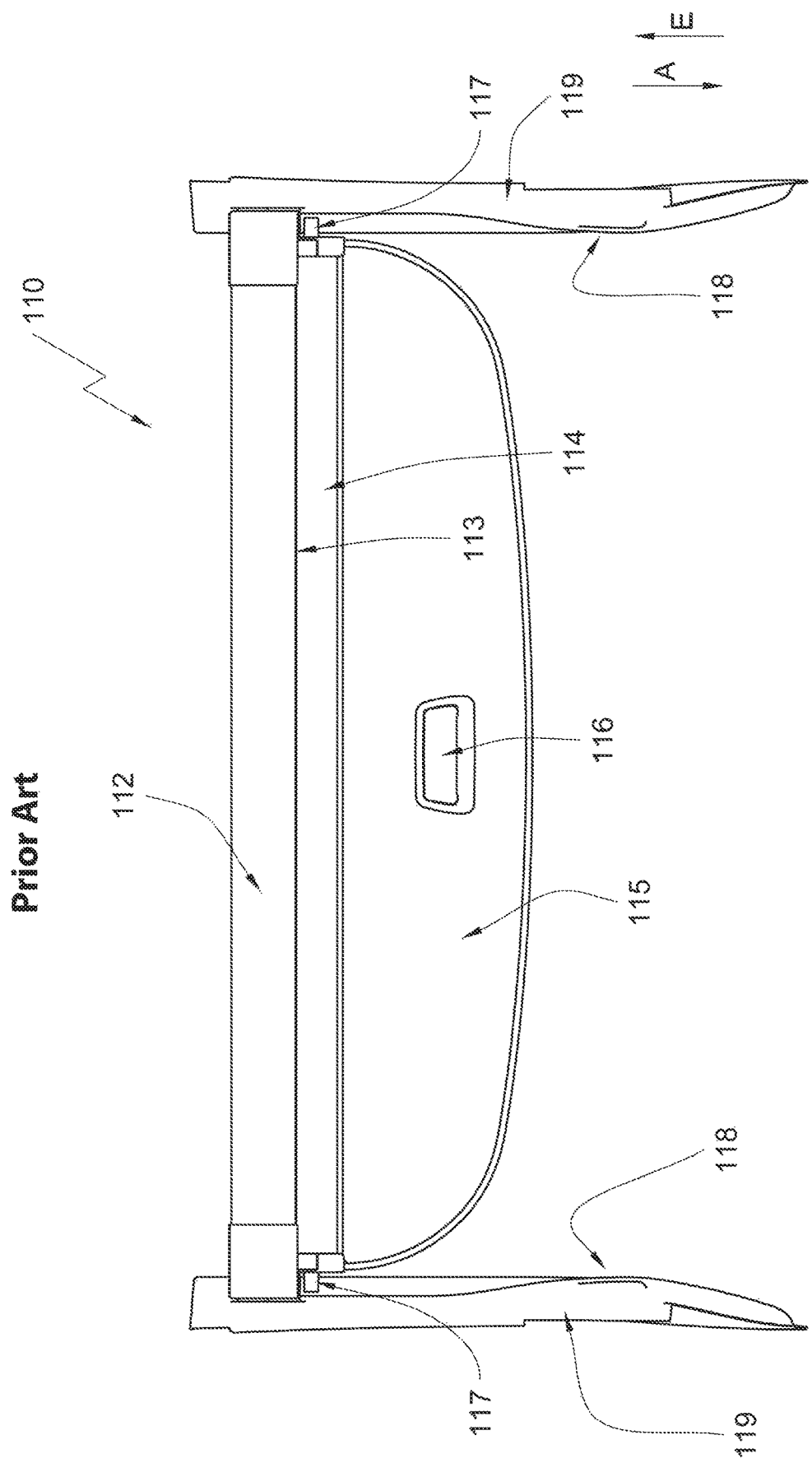
FIG. 2 shows a cargo space cover of the prior art in a retracted position.

FIG. 1 and FIG. 2 show a cargo space cover 110 known from the prior art. The cargo space cover 110 in the prior art has a cover web 111, which is arranged with a first edge at a winding shaft not shown. The winding shaft is rotatably mounted within the winding shaft housing 112 and has a drive, in particular a spring-loaded motor. The spring-loaded motor applies a restoring force to the cover web 111 in a direction opposite to an extension direction A, and when the cover web 111 is not fixed, moves the cover web 111 back in a retraction direction E, by rolling up the cover web 111 onto the winding shaft.

At an edge 113 away from the winding shaft, the cover web 111 is provided with a extension profile 114, to which a contour plate 115 is connected. A handle recess 116 is embedded into the contour plate 115, so that a user can pull the cover web 111 out from the winding shaft. The extension profile 114 carries at its two ends the fixing elements 117 which are engaged into to appropriate recesses of an interior part 119 of a vehicle, so as to maintain the cover web 111 in a function position.

Vans, in particular vans having a modern structure of this type, generally has a diameter in the body in the area of the so-called D-pillar, that is, in a transition from a side wall of the vehicle to an inlet of the cargo space, so that the cargo space (seen horizontally) is tapered or narrowed in this area.

To ensure that the cover web 11 is in tension, the cover web, in particular the edge region of the cover web extends to the interior part with only a minimum gap. It is necessary to realize the fixation at the point in the extension direction A before the cargo space narrows by using the fixing element 117 and the recess 118. In this area, the extension profile 114 is mounted into the recess 118 of the interior part 119 by using the fixing element 117.

The fixing element 17 is generally used for guiding, and extends in the rail to the narrowing of the cargo space.

To completely close a gap now generated between the extension profile 114 and a door of the cargo space that is not shown, the extension profile 114 generally carries the above-described contour plate 115 which is constructed as self-supporting and maintained in a horizontal direction in an appropriate manner. The larger the curvature of the body of the vehicle in the region of the D-pillar is, the larger the gap that needs to be bridged is, and moreover, the lager the contour plate 115 or the reinforced end portion 120 is constructed with respect to the depth measured in the extension direction A.

In the illustration of the prior art shown in FIG. 1, in which the cover web 111 is in its function position, and there is a risk that a relatively deep contour plate 115 vibrates during driving, which first may result in unfavorable noise. In particular, dynamic forces that occur during driving will load the fixed area and any component that maintains the contour plate 115 in the horizontal direction in any case.

FIG. 2 a cargo space cover 110 of the prior art in a retracted state is shown. Herein, the cover web 111 is rolled up onto the winding shaft. However, it can also be seen that relative to the winding shaft housing 112, the contour plate 115 protrudes quite far to the right in the extension direction A, and consequently hinders the use of the cargo space. In thus case, there is also a problem that the vehicle vibrates or a dynamic force exists during driving. The load problem and negative vibration occasionally may be solved by the user by the following means, that is, folding the contour plate upward to an upright direction. However, this hinders the view through the rear of the vehicle and is consequently dangerous.

Figure 7:
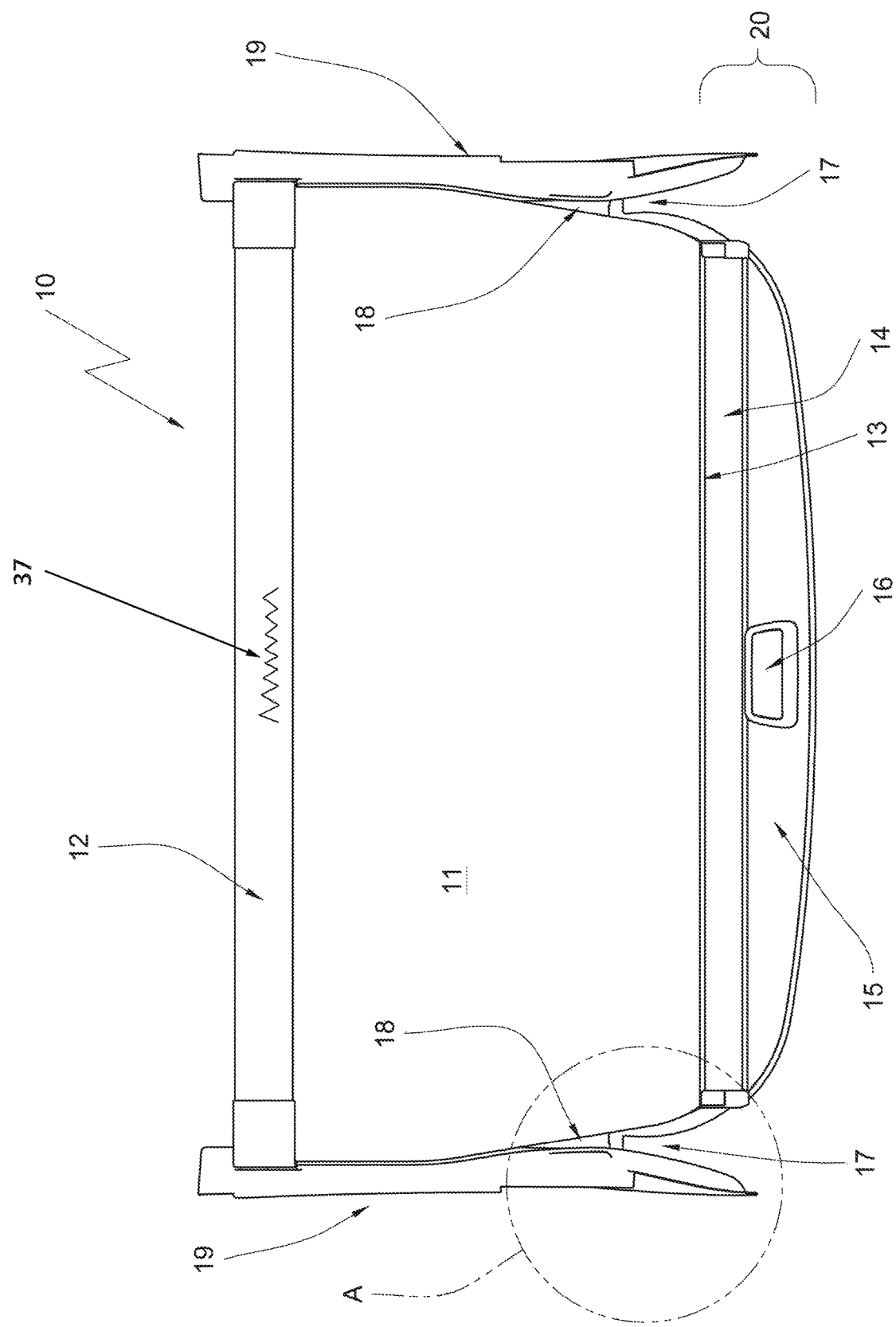
FIG. 7 shows a cargo space cover according to the present invention in a function position.
Figure 8:
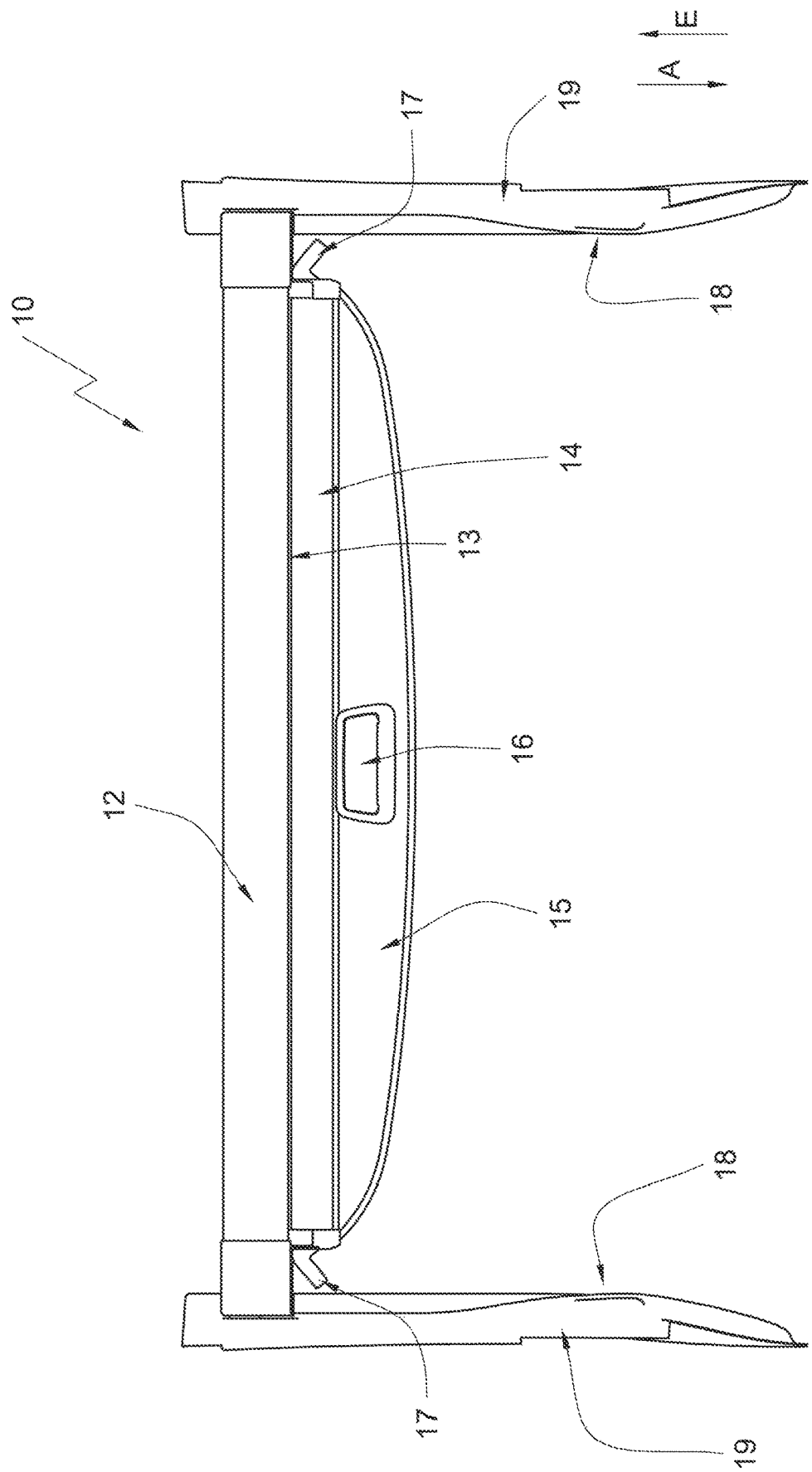
FIG. 8 shows a cargo space cover according to the present invention in a retracted position.

FIG. 7 and FIG. 8 show a cargo space cover 10 of the type according to the present invention. The same as the cargo space cover 110 in the prior art, the cargo space cover first has a cover web 11 which is arranged with a first edge at a winding shaft not shown. The winding shaft not shown is rotatably mounted within a winding shaft housing 12 and has a drive, in particular a spring-loaded motor. The spring-loaded motor applies a restoring force in a direction opposite to an extension direction A to the cover web 11, and causes the cover web 11 to roll up onto the winding shaft when the cover web 11 is not fixed. At an edge 13 away from the winding shaft, the cover web 111 provided with a extension profile 14, which is coupled with a contour plate 15 at a side of extension profile away from the winding shaft housing 12. The contour plate 15 itself is provided with an handle recess 116, by means of which, the cover web 11 can be pulled out from the winding shaft in the extension direction A and maintained in a function position. The contour plate 15, together with the extension profile 14, forms a reinforced end portion 20 of the cover web 11, which may also be constructed. For example, it may be imagined that the reinforced end portion 20 is reinforced by combining and/or screwing or laminating a plurality of cover web sections. The reinforced end portion 20 carries a fixing element 17 at a side of the reinforced end portion 20 facing an interior part 19, and is engaged into a recess 18 of the interior part 19, so as to maintain the cover web 11 in is function position.

It is pointed out merely for clear representation that, the illustration of the cover web 11/111 at the fixing element 17 or 117, in particular in a conical inlet range is first used for ensuring clear display of a fixed area, and the contour of the cover web does not necessarily correspond to the tendency of a real contour.

Figure 3:
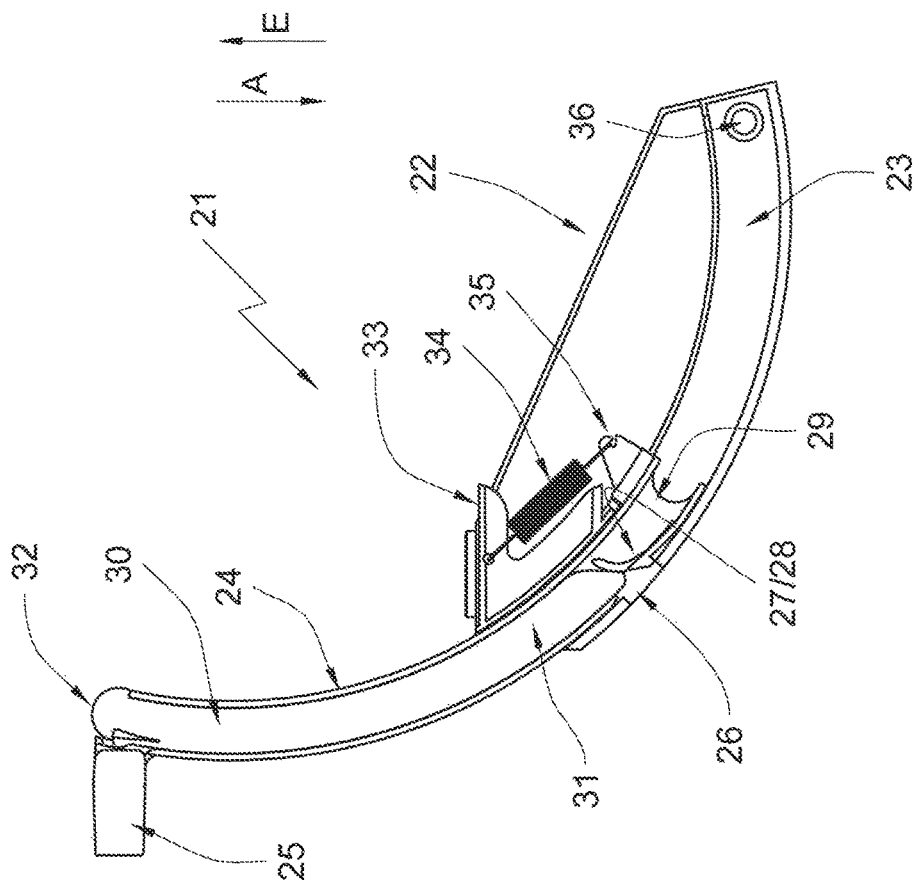
FIG. 3 shows a fixing element of the cargo space cover according to the present invention in an active position.

In FIG. 3 and FIG. 6, a fixing unit, used for a cargo space cover 10, and marked overall with 21 is shown in the present invention. The fixing unit 21 first includes a guiding frame 22, which forms a guiding rail 23, in which a guiding arm 24 is guided. The guiding arm 24 has a journal 25 at a free end part thereof and forms together with the journal a fixing element 17.

The guiding rail 23 has a locking recess 26, and a locking element 27 (which is constructed as a stop hook having resilience herein) of the guiding arm 24 is engaged into the locking recess 26 in a locking manner when the guiding arm 24 is in an operative position by the journal. The guiding arm 24 has an adjustment recess on a side surface thereof, within which a handle 30 is guided. A first end 31 of the handle cooperates with the locking element 27, and a second end 32 of the handle 30 exits, at a normal position of the handle 30, from the adjustment recess 29 to the free end of the guiding arm 24.

In addition, the guiding frame 22 has an anchoring element 33, on which the spring element 34 is arranged with a first articulated arm thereof. A second articulated arm of the spring element 34 is arranged at a coupling member 35 of the guiding arm 34.

Function of the fixing unit according to the present invention:

In FIG. 3, the fixing unit with the fixing element 17 (which consists of the guiding arm 24 and the journal 25) is shown in its active position. In the active position, the journal 25 can be engaged into the recess 18 of the interior part 19, so that the cover web 11 is maintained in its function position.

Figure 4:
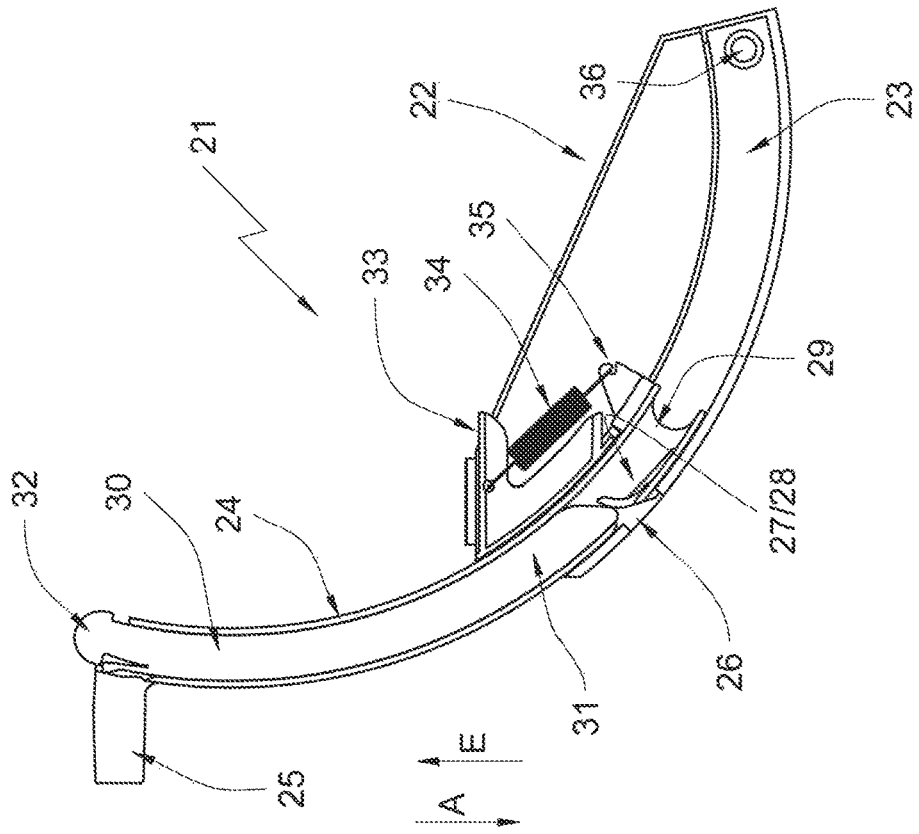
FIG. 4 is an illustration of the fixing unit according to FIG. 3, unlocked.

Now, if the cover web 11 moves back from its function position to the retracted position in a retraction direction E, the second end 32 of the handle 30, which moves from a free end of the adjustment recess 29 to an active position of the journal 25, moves to an appropriate support, this may particularly be a part of the winding shaft housing 12. When the second end 32 moves to the support, the handle 30 slides within the adjustment recess 29 in the extension direction A, and the locking element 27 is lifted from a lock position to an unlock position. The unlock position is shown in a specific example in FIG. 4. The first end 31, provided with a lifting inclined surface that is not drawn in detail, is engaged to a lifting bulge of the stop hook 28 that has resilience, moves the lifting bulge to the unlock position, in which the engagement to the locking recess 26 is repealed.

Now, the guiding arm 24 moves to the support and preferably to the winding shaft housing 12, and also moves in the extension direction A. In this case, the guiding arm slides into the guide rail 23. During the movement of the guiding arm 24 or in particular the journal 25 in the extension direction A, the spring element 34 is in tension and generates a restoring force that causes reciprocal movements. Partial movement, shown in FIG. 5, along with the guiding arm 24 or particular the journal 25 ends in the extension direction A, when the guiding arm 24 moves to an end limiter 36 formed by the guiding frame 22.

In a preferable manner, a drive of the winding shaft, causing the cover web 11 to roll, applies a sufficient force to the fixing unit 21, to cause the unlock movement of the handle 30 and the movement of the guiding arm 24. When the cover web 11 moves in an opposite direction and the cover web 11 is driven to move in the extension direction A, the handle 30 and the guiding arm 24 move in an opposite direction. First, the restoring force of the spring element 34 will cause the guiding arm 24 and the journal 26 to move in the retraction direction E to exist the guiding rail 23. Once the handle 30 is not in contact with the support, in particular with the winding shaft housing 12, the handle 30 exists the adjustment recess 29 due to a restoring force of the stop hook 28 until an initial state shown in FIG. 1 is reached.

Position of the fixing element 21 according to the present invention within the cargo space cover according to the present invention.

The fixing unit 21 is fixed at the covering member 11 in the area of the reinforced end portion 20. In specific embodiments of the present invention, the guiding frame 22 has a fixing member that is not shown herein in order to be arranged at the extension profile 14. The fixing member may particularly be an end cover for the extension profile 14. The guiding arm 24 together with the journal 25 extends in the direction of the winding shaft housing 12.

It may be determined from the comparison between FIG. 1 and FIG. 7 or between FIG. 2 and FIG. 8 that compared with the prior art, the reinforced end portion 20 of the cargo space cover 10 described according to the present invention is shorter in its depth measured in the extension direction A. The cover web 11 of the cargo space cover 10 according to the present invention is extended correspondingly, so that the cargo space cover 10 of the present invention has an extending length which is equal to that of the cargo space cover 110 in the prior art.

Modification notes: the gap between guiding elements in the prior art is also used for guiding of the rail in the interior part.

In addition, to ensure that the fixing element 17, in particular the journal 25 can guide the cargo space cover 10 in an appropriate rail of the interior part 19, the positions of the journal 25 and the recess 18 remain unchanged. Therefore, a flexible cover web 11 now additionally crosses a section between the fixing element 17 and the reinforced end portion 20, when has been formed in the poor art by the extension profile 114 and a part of the contour plate 115.

When the cover web 11 moves to the retracted position in the retraction direction E, the fixing element 17 moves in the extension direction A when abutted against the support or the winding shaft housing 12, until the fixing element is slightly at a storage position in the reinforced end portion, which in the embodiment is in the area of the extension profile 14, at the end of the movement. In the same way as the fixing element 17 moves, the cover web section that additionally exists compared with the prior art is rolled up onto the winding shaft, so that, space occupied by the reinforced end portion 20 of the cargo space cover 10 according to the present invention is significantly reduced, particularly in the retracted position of the cover web 11. This is particularly apparent from the comparison between FIG. 2 and FIG. 8.

The advantage of the shortened reinforced end portion 20 or in particular the advantage of the shortened contour plate 15 is realized both in the cover web 11 in the retracted position and the cover web 11 in the function position. When the cover web 11 is in the function position, fewer loads of the recess 18 and the fixing element 17 are achieved because of the shortened end portion 20, because the reinforced end portion 20 has a reduced weight compared with the prior art.

In the cargo space cover 10 according to the present invention, the tendency of vibration is also decreased.

To use cargo space of a vehicle, a shortened and reinforced end portion has a particular advantage, since it slightly extends into the cargo space. When the cover web 11 is in the retracted position, there are fewer limits when loading articles are recycled. If a user folds the reinforced end portion or the contour plate up for further optimization, the reinforced end portion or the contour plate block the rear field of view much less.

It may be found by observing the accompanying drawings more precisely that, the guiding arm 24, such as a guide 22 has an arched outer contour. The outer contour corresponds, at least as the guiding arm 24 does, to an edge contour of the cargo space cover 10 enforced by the body shape in the rear cover area. The guiding arm 24 in the active position spans the area to the extension profile 14, and moreover, is generally arranged below the cover web 11, different from the figures due to the described reason. Therefore, the guiding arm 24 supports the edge area of the cover web 11, which may have a risk of bending in the gravity direction. In that regard, the guiding arm 24 provides a supporting function for the cover web 11.

A section of the cover web 11 close to the reinforced end portion 20 may be reinforced by, for example, a splice arranged parallel to the winding shaft. Therefore, winding capability of the cover web 11 will not be additionally reinforced when the cover web 11 is rolled up onto the winding shaft at the retracted position.

The mechanism for moving the fixing element 17 may also be designed differently. Therefore, it may be considered to implement a movement in the extension direction A by swaying about an axis parallel to the winding shaft.

REFERENCE NUMERALS AN DESIGNATIONS

10 Cargo apace cover
110 Cargo space cover
11 Cover web
111 Cover web
12 Winding shaft housing
112 Winding shaft housing
13 Edge away from a winding shaft
113 Edge away from a winding shaft
14 Extension profile
114 Extension profile
15 Contour plate
115 Contour plate
16 Handle recess
116 Handle recess
17 Fixing element
117 Fixing element
18 Recess
118 Recess
19 Interior part
119 Interior part
20 Reinforced end portion
120 Reinforced end portion
21 Fixing unit
22 Guiding frame
23 Guiding rail
24 Guiding arm
25 Journal
26 Locking recess
27 Looking element
28 Stop hook having resilience
29 Adjustment recess
30 Handle
31 First end of 30
32 Second end of 30
33 Anchoring element
34 Spring element
35 Coupling member
36 End limiter
37 Spring loaded drive
A Extension direction
E Retraction direction

What is claimed is:

1. A cargo space cover for passenger vehicles, the cargo space cover comprising:
    a cover web that includes a first edge that is arranged at a winding shaft and movable between a retracted position in which the cover web is rolled up onto the winding shaft and a functional position in which the cover web is unrolled from the winding shaft;
    a winding shaft housing in which the winding shaft is rotatably supported;
    a spring-loaded drive for the winding shaft which applies a return force to the cover web against a pulling force;
    at least one fixing element or a journal configured to fix the cover web in the functional position; and
    a reinforced end portion arranged at an end of the cover web that is remote from the winding shaft,
    wherein the at least one fixing element is movable relative to the reinforced end portion from an active fixing position to a storage position, and
    wherein the active fixing position of the at least one fixing element is further remote from the reinforced end portion than the storage position of the at least one fixing element.

2. The cargo space cover according to claim 1, wherein the fixing element is movable relative to the cover web in a direction towards the end of the cover web that is remote from the winding shaft.

3. The cargo space cover according to claim 1, wherein a locking element maintains the fixing element in the active fixing position.

4. The cargo space cover according to claim 1, wherein a spring element acts against a movement of the fixing element from the active fixing position to the storage position.

5. The cargo space cover according to claim 1, wherein the cargo space cover is provided with a guide in which the fixing element is movable.

6. The cargo space cover according to claim 5, wherein the guide is a part of the reinforced end portion and receives an edge contour of the cover that receives a body shape of the passenger vehicle.

7. The cargo space cover according to claim 4, wherein the spring element has a spring force that is smaller than a reset force of the spring loaded drive for the winding shaft.

8. The cargo space cover according to claim 3, wherein the winding shaft housing cooperates with the locking element to cause unlocking.

* * * * *